(12) United States Patent
Goecke et al.

(10) Patent No.: US 7,702,313 B1
(45) Date of Patent: Apr. 20, 2010

(54) TELECOMMUNICATIONS TERMINAL

(75) Inventors: Albrecht Goecke, Munich (DE); Stephan Mentz, Eching (DE); Stefan Prange, Munich (DE); Bernd Prohaska, Rettenbach (DE); Heiner Thomfohrde, Unterschleissheim (DE); Ingo Weghorst, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 10/069,621

(22) PCT Filed: May 16, 2000

(86) PCT No.: PCT/DE00/01546

§ 371 (c)(1),
(2), (4) Date: Jun. 5, 2002

(87) PCT Pub. No.: WO01/16897

PCT Pub. Date: Mar. 8, 2001

(30) Foreign Application Priority Data

Aug. 27, 1999 (EP) .................................. 19940823

(51) Int. Cl.
*H04M 1/66* (2006.01)
*H04M 1/68* (2006.01)
*H04M 3/16* (2006.01)

(52) U.S. Cl. .................. 455/411; 455/406; 455/407
(58) Field of Classification Search ......... 455/406–407, 455/411
See application file for complete search history.

(56) References Cited

U.S. PATENT DOCUMENTS

| 5,825,871 | A | * | 10/1998 | Mark | .................. | 379/357.03 |
| 5,887,266 | A | * | 3/1999 | Heinonen et al. | ........... | 455/558 |
| 2001/0011299 | A1 | * | 8/2001 | Kohda et al. | ................ | 709/206 |

FOREIGN PATENT DOCUMENTS

| WO | WO 98/11519 | | 3/1998 |
| WO | WO 98/34203 | * | 8/1998 |
| WO | WO 98/58510 | | 12/1998 |
| WO | WO 99/00773 | | 1/1999 |
| WO | WO 99/08238 | | 2/1999 |

* cited by examiner

*Primary Examiner*—Nay A Maung
*Assistant Examiner*—Tuan H Nguyen
(74) *Attorney, Agent, or Firm*—Laurence A. Greenberg; Werner H. Stemer; Ralph E. Locher

(57) ABSTRACT

Telecommunications terminal having a memory device to store user-specific data, having a transmission device whose input is connected to a memory device, where the memory device and the transmission device are designed to store at least one string of digits and to transmit it while a connection exists, and an authentication device to protect the user-specific data against unauthorized access are provided.

15 Claims, 2 Drawing Sheets

TELECOMMUNICATIONS TERMINAL

CLAIM FOR PRIORITY

This application claims priority to International Application No. PCT/DE00/01546 which was published in the German Language on Mar. 8, 2001.

TECHNICAL FIELD OF INVENTION

The invention relates to a telecommunications terminal having a memory device for storing user specific data.

BACKGROUND OF THE INVENTION

For modern telecommunications terminals (or terminal configurations which include supplementary components), various options are known for inputting and storing user-specific data and also for transmitting such data to another subscriber.

These include, by way of example, telephone answering machines, separate or else integrated into a conventional landline telephone, and in which user-specific information is stored in a semiconductor memory or on tape by means of voice input and is transmitted to the calling subscriber in the event of a call not being taken.

The call number memories in modern landline telephones or mobile telephones (also referred to here as a "telephone book") can also be regarded as memories for user-specific data which are supplied by means of an input from the user and can be accessed by suitable selection means in order to either output a stored call number on a display unit or to set up a connection to this call number directly (or both).

A configuration is also produced by the internal storage device, provided to implement the SMS (Short Message Service) or e-mail in mobile telephones, for buffer-storing a short message and for sending it to a desired recipient after input has ended.

Although a multiplicity of different storage options for user-specific data are known for modern telecommunications terminals, and in this context it is also known practice to supply such data directly from the respective memory device to a transmission device for transmission to another subscriber, certain instances of application involve complex and also, in terms of reliability and data transmission and the security of the transmitted data against unauthorized access, unsatisfactory actions.

Thus, in recent years, it has become commonplace to be able to handle a multiplicity of diverse services. For example, to handle the delivery of certain goods, booking a flight, booking a trip or else a financial transaction—via a telecommunications network, with the orderer or purchaser merely giving the number and the validity period of a credit card or customer card or the like to the vendor or supplier by telephone. For this purpose, before the telephone call, or even during it, the user needs to get out the appropriate card or to retrieve the data possibly from an organizer or a database in which he has stored them temporarily, so that he can then inform the subscriber on the other terminal of them by speaking. In loud situations, this type of communication is anything but reliable, which means that misunderstandings with severe consequences may arise. Furthermore, in many instances of application in which the communication is not completely screened from third parties, it is entirely possible for the relevant string of digits to be overheard when submitted audibly and for the credit card number thus to fall into the wrong hands.

Finally, this way of handling credit or customer card numbers is associated with a degree of "fiddling", which is extremely disagreeable to the user, and in some situations—for example during a car journey—it is not possible at all in practice.

SUMMARY OF THE INVENTION

In one embodiment of the invention, there is a telecommunications terminal which allows easier ordering of goods or services via a telecommunications network.

In one aspect of the invention, the telecommunications terminal is provided with a device to store at least one string of digits and to transmit it while a connection exists in response to the activation of suitable actuation means by the user. In contrast to a telephone answering machine, for example, for an incoming call, the memory device is not connected as the other caller instead of the actual terminal, but rather that switching it on during a normal terminal connection is controlled by the user.

In another aspect of the invention, the memory device, and optionally the transmission device, has an authentication device to protect the sensitive user-specific data (specifically the credit-card or customer-card or account number or the like) against unauthorized access to the memory or to the transmission device.

In one preferred embodiment, the input device comprises digit keys, expediently the digit keypad on a telephone or on a supplementary module for a telephone.

In an alternative embodiment, the user-specific data may also be input using the telecommunications terminal's microphone and also a voice memory or voice processing device connected downstream of said microphone.

In either case, implementing the data input requires no change to the familiar user interface on the terminal, and in the case of input using the digit keys requires slight hardware additions inside the equipment. By contrast, voice input naturally requires a higher level of hardware complexity, particularly as compared with a simple landline telephone, but an added-feature mobile telephone already has the fundamental hardware prerequisites for this.

In another preferred embodiment, for which the prerequisites are preferred in a mobile telephone, the input is implemented within the context of special menu guidance. This can be done using a special "Payment Info" (or the like) menu item or section which enables access to the memory device for the credit card number or the like after the predetermined authentication data have been input.

Examples of authentication data which can be used are a password, a short combination of digits (PIN=Personal Identification Number) or else biometric data, such as a fingerprint or a voice sample, or data stored in a universal Smartcard. According to the chosen method of authentication, the authentication device has suitable input, comparison and storage.

Generally speaking it is easy to implement input, storage and evaluation of a PIN in a telecommunications terminal. What is somewhat more complex and cannot be implemented readily in simple landline terminals which do not have a keypad which can be switched at least to alphanumeric mode is authentication using a password, and authentication using biometric data is probably more likely to be regarded as a future solution on account of the relatively high level of hardware and software complexity. Besides this, the latter solution is known to have the drawback that the access authorization is linked absolutely to the presence of the biometric features and therefore cannot be transferred.

The card information retrieved from the memory device can be transmitted in various ways, which each have certain advantages in a particular context. On account of the simplicity and usability for the landline network as well, the dual tone multiple frequency (DTMF) method should be mentioned in this context, the method having been proven for comparable applications—for example communicating with telephone computers at banks or the like—for years. Transmission using a preconfigured fax or e-mail program is also possible and can naturally be implemented most easily in a terminal already provided with a fax mode.

In line with the mobile radio standards, transmission as "Unstructured Supplementary Service Data" (USSD) or as "Short Message" or, in future, GPRS is also suitable, in particular. Thus, in line with the GSM standard common today, it is possible to send and receive short text messages using the SMS or, in future, e-mail in parallel with a voice connection. The data sent in this way can even be encrypted using the "SIM Application Tool Kit" in order—in addition to the encryption methods in mobile radio technology, which are in high regard anyway—to provide additional security on the transmission path. Naturally, appropriate reception-end decryption is then required.

Finally, voice transmission is possible and, on account of the hardware prerequisites, can also be implemented with relatively little complexity especially by landline telephones having an integrated telephone answering machine or by mobile telephones having a voice memory. It is also conceivable to convert the numbers which are input into spoken text using a simple voice synthesizer.

Particularly for a mobile radio terminal, but maybe also for added-feature landline terminals (for example a combi fax machine), it is advantageous to preconfigure a number of transmission options for the stored card or account data in order to be able to meet any different requirements of the suppliers in terms of the data transmission. In the case of a mobile radio terminal or a modern added-feature telephone, the relevant selection will again be able to be made most appropriately within the context of menu control.

In one embodiment, the memory device for the user-specific data is preferably in the form of a multi-area random access memory so that—in line with the requirements of modern business transactions—a plurality of credit card, customer card or account numbers can be stored in retrievable form. The actuation device is then naturally needs to be in the form of a selection device. This selection device can also—in the case of a mobile telephone at any rate—be implemented most conveniently using menu guidance. In one preferred embodiment, there is a telecommunications terminal has a device to, transmit the user-specific data to the requester via an IP network, in particular the Internet—for example a pre-installed Internet browser.

The application options for the invention can be significantly extended in an embodiment in which the input device and/or the memory device and, in particular, both devices are held in a supplementary module having a separate housing for connection to an already existing mobile telephone or other telecommunications terminal. This is because this allows already existing equipment having an interface with data capability to be retrofitted. Such a supplementary module can naturally also perform further convenience functions extending the performance range of the existing terminal, and may also be used as a supplementary unit for other technical equipment. Specifically in this case, it also appears expedient to provide authentication means for evaluating biometric data or to fit a SmartCard reader.

BRIEF DESCRIPTION OF THE DRAWINGS

The invention described in the description below of preferred exemplary embodiments with reference to the figures, in which.

DETAILED DESCRIPTION OF THE PREFERRED EMBODIMENT

Figure 1:
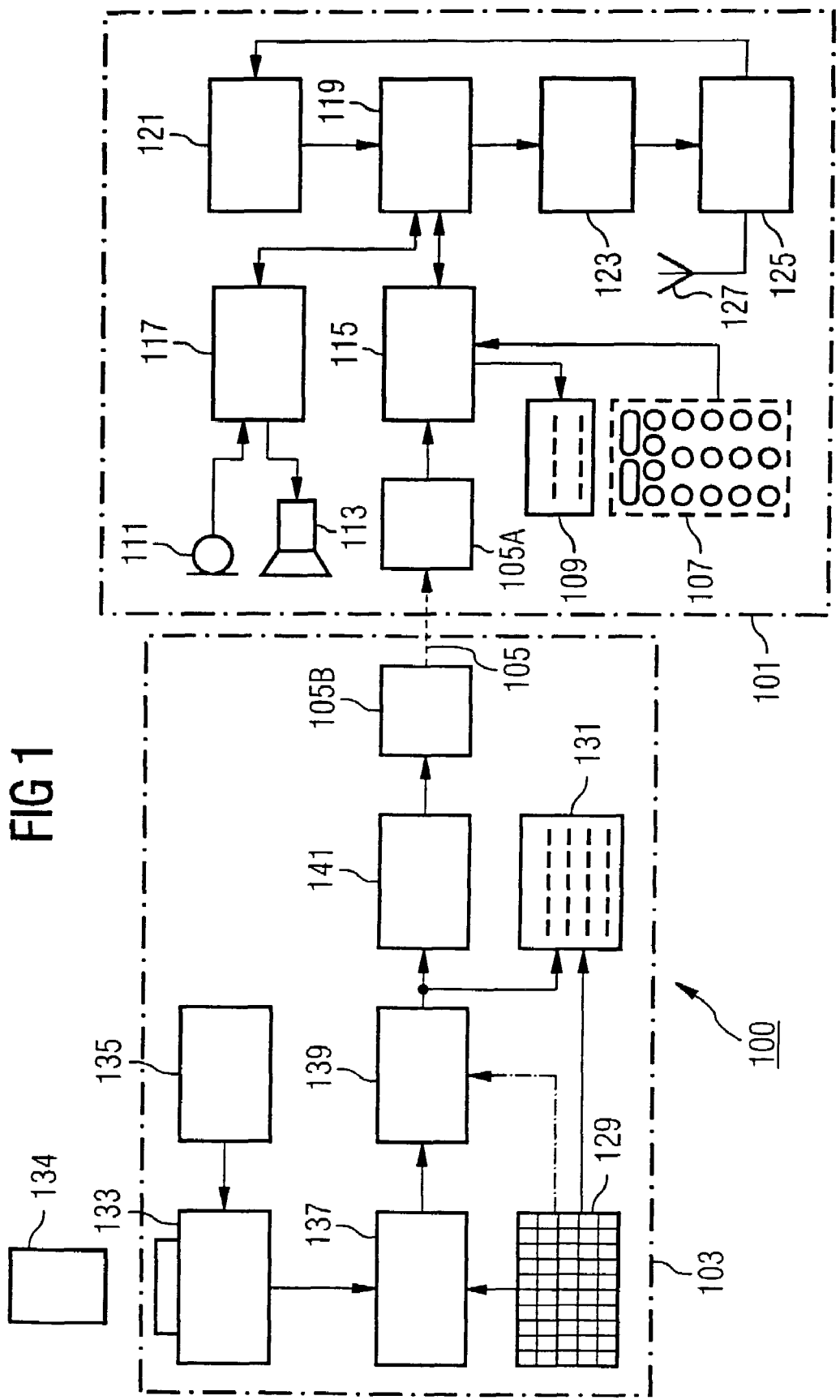
FIG. 1 shows a basic illustration of a first embodiment in the form of a function block diagram.

FIG. 1 shows a mobile radio terminal configuration 100 comprising a mobile telephone 101 and a supplementary unit 103. The mobile telephone 101 and the supplementary unit 103 are connected to one another by means of an infrared transmission link 105 comprising a first interface 105A belonging to the mobile telephone 101 and a second interface 105B belonging to the supplementary unit 103.

In terms of hardware, the design of the mobile telephone 101 is known per se. This design comprises an input keypad 107, an LCD display unit 109, a microphone 111 and also an earphone 113 as customary input and output means. The input keypad 107 and the LCD display unit 109 are connected to a baseband processing stage 119 via a controller 115, and the microphone 111 and the earphone 113 are connected to the baseband processing stage 119 via an AF stage 117. The input of the baseband processing stage is connected to a reception part 121, and the output of the baseband processing stage is connected to a transmission part 123, both of these parts being connected to an antenna 127 of the mobile telephone 101 via a diplexer 125.

The supplementary unit 103 has a separate, alphanumeric keypad 129 and a large-area alphanumeric display unit 131. The supplementary unit 103 also has a card reading and evaluation unit 133 for a SmartCard 134, the card reading and evaluation unit 133 having an associated authentication memory unit 135. An enabling switching stage 137, controlled by the card reading and evaluation unit 123, is connected between the output of the keypad 129 and the input of a card number memory unit 139. The output of the latter is connected to the input of the second infrared interface 105B via an encryption stage 141. In addition, the supplementary unit 103 also has the normal elements for microprocessor control, i.e. a processor/controller, a main memory and a program memory, which interact with the input keypad 129 and the display unit 131 in a manner known per se—this microprocessor control is not shown, however, in the interests of improved clarity.

With the mobile radio terminal configuration shown in this case, the supplementary unit 103 allows the use of comprehensive value added services which can be used with the mobile telephone 101 alone, not at all or only with very complex inputs. Within the context of implementing the invention, the relevant issue here is to implement the ordering of goods and services and payment for them via the mobile radio network. The user authenticates himself by inserting his Smartcard 134 into the card reading and evaluation unit 133, in which the data stored on the Smartcard 134 are evaluated in a manner which is known per se. If the result of authentication is positive, the enabling switching stage 137 is used to enable memory contents in the card number memory unit 139 to be input and changed or retrieved using the input keypad 129 and the display unit 131. The memory unit 139 can be used for non-volatile storage of, in each case, an association code or identification code and a string of digits comprising a credit or customer card number and a validity period or an account number in table form in a plurality of memory areas 139i.

If the mobile telephone 101 has been used to set up a connection to a supplier of goods or services and the delivery of certain goods or of certain services has been agreed, the menu guidance provided by the controller 115 in the mobile telephone 101 is used to choose a menu item, using the mobile telephone's input keypad 107, which activates the infrared transmission link 105 to the supplementary unit 103 to transmit the number and the validity period of a particular credit card from the card number memory unit 139, via the encryption stage 141 and the interfaces 105B, 105A, to the controller 115 in the mobile telephone 101 and sends the data from said mobile telephone to a terminal associated with the supplier.

According to the actual form of function division between mobile telephone 101 and supplementary unit 103, the relevant commands can be input either using the input keypad 107 on the mobile telephone or using the keypad 129 on the supplementary unit. In either case, the data are provided in suitably encrypted form directly from the memory unit 139 and are encrypted in suitable fashion, which means that it is not necessary to search for the data on the card (or in a notebook or database or the like) and to speak or use another form of on-the-spot input. This means that there is also no longer any risk of unauthorized third parties being able to pick up the card data during this input process, and provision of the required data for the other party to the transaction becomes much more convenient for the user.

Figure 2:
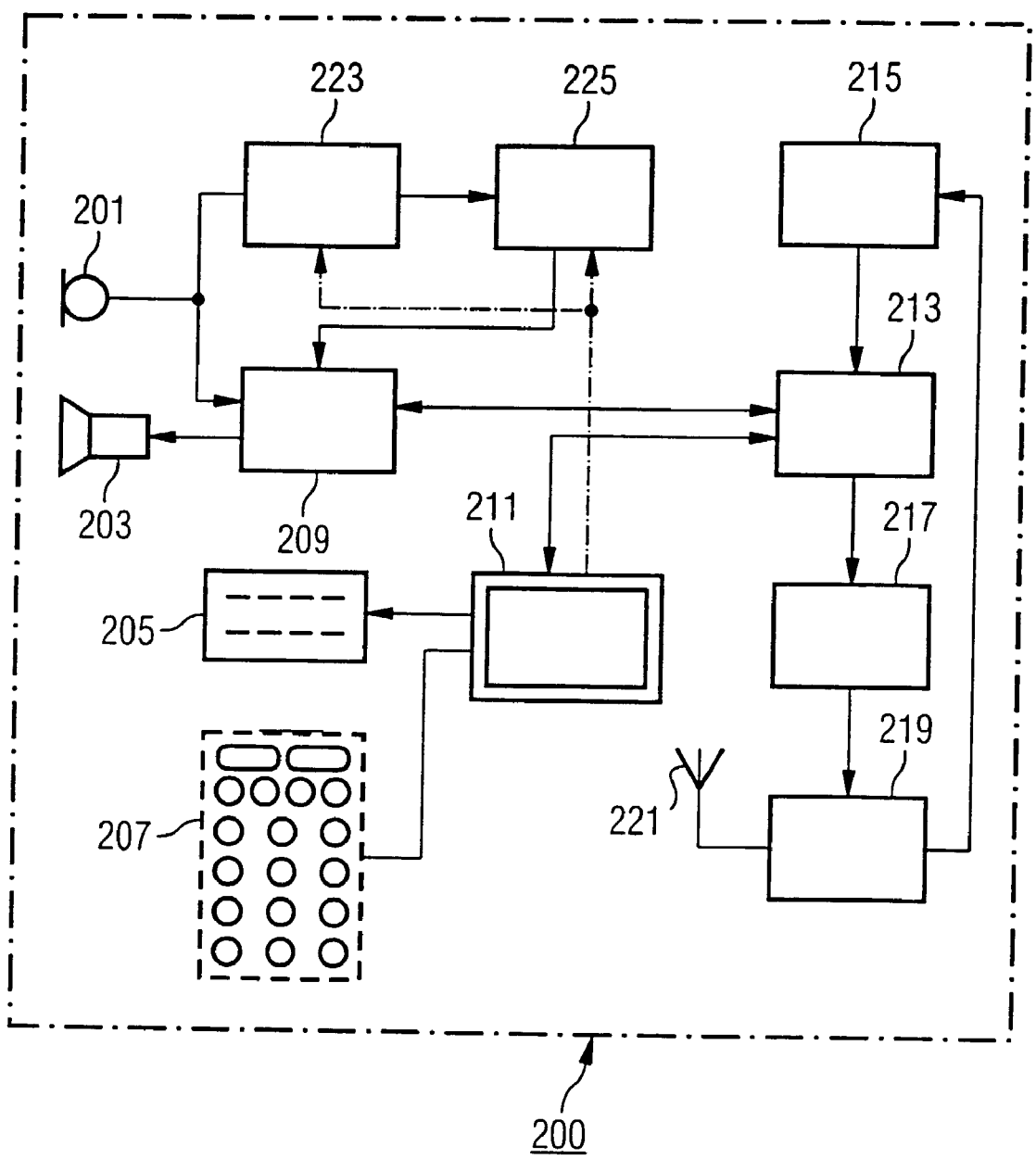
FIG. 2 shows a second embodiment in the form of a function block diagram.

FIG. 2 shows a second embodiment in the form of a mobile telephone 200 drawn schematically as a function block diagram. This mobile telephone 200 also has a basic design which is known per se. This design comprises, in particular, a microphone 201, an earphone 203, an LCD display unit 205 and an input keypad 207 as input and output element, of which the microphone 201 and the earphone 203 are connected to an AF stage 209, and the display unit 205 and the input keypad 207 are connected to a controller 211. Both the AF stage 209 and the controller 211 are connected to a baseband processing stage 213 whose input is connected to an RF reception part 215 and whose output is connected to a transmission part 217, said the parts in turn being connected to an antenna 221 via a diplexer 219. To this extent, the design also corresponds to that of the mobile telephone 101 shown in FIG. 1.

In this case, the microphone 201 is also connected via an enabling switching stage 223 to the input of a voice memory unit 225 whose output is in turn connected to the AF stage 209. Both the enabling switching stage 223 and the voice memory unit 225 are also connected to the output of the controller 211 via control signal inputs.

The scenario, already mentioned above, of transmitting a credit-card or account number or the like to a supplier of goods or services during an existing mobile radio connection is in this case produced as follows: first, the microphone 201 and the enabling switching stage 223, switched to enable by the controller 211, are used to store a string of digits comprising a card number and a validity period in the voice memory stage 225. After actuation of a softkey on the input keypad 207, this string of digits is output to the AF stage 209 from the voice memory 225 under the control of the controller 211. After appropriate processing in the baseband processing stage 213 and the transmission stage 217, it is transmitted to the terminal associated with the supplier of goods or services. On this case, authentication takes place by virtue of an additional PIN or a password being input using the input keypad 207. The voice memory stage 225 used can be a voice memory unit already provided per se in mobile telephones today. Alternatively, an additional unit can be provided specifically for storing the card information as voice information.

The implementation of the invention is not limited to the examples described above, but rather is also possible in a multiplicity of modifications lying within the scope of action of a person skilled in the art. It is thus also possible in the case of a landline telephone, in particular, and in this case too the components provided for inputting, storing and transmitting the card data may be provided either in a telephone—equipped with appropriate added features—itself or in a supplementary unit connected thereto. If a voice input unit is provided (as in the case of the embodiment in FIG. 2), this can also be connected to a downstream voice/text conversion unit and to a device to transmit the data which have been input in the form of voice information in text format.

Instead of an infrared link between the actual terminal and a supplementary unit, a line-conducted connection or else, in future, a special radio connection (Bluetooth) may also be provided.

What is claimed is:

1. A telecommunications terminal, comprising:
a memory device to store user-specific data;
an input device having an output connected to the memory device, to input the user-specific data into the memory device;
a transmission device having an input connected to the memory device, to transmit the user-specific data to another subscriber in a telecommunications network, the memory device and the transmission device are configured to store at least one string of digits and to transmit the string while a connection to the other subscriber exists; and
an actuation device to transfer the user-specific data from the memory device to the transmission device while the connection exists;
an authentication device to protect the user-specific data against unauthorized access; and
the transmission device has a plurality of preconfigured transmission units each having an associated transmission method, and a selection device to select one or more preconfigured transmission devices.

2. The telecommunications terminal as claimed in claim 1, wherein the input device comprises digit keys.

3. The telecommunications terminal as claimed in claim 1, wherein the input device comprises a microphone, and a voice memory or voice processing device is connected downstream of the microphone.

4. The telecommunications terminal as claimed in claim 1, wherein the input device and/or the actuation device have menu guidance.

5. The telecommunications terminal as claimed in claim 1, wherein the authentication device comprises input, comparison and storage units to authenticate by password, PIN or biometric data.

6. The telecommunications terminal as claimed in claim 1, wherein the transmission device has multifrequency transmission unit.

7. The telecommunications terminal as claimed in claim 1, wherein the transmission device has voice transmission unit.

8. The telecommunications terminal as claimed in claim 1, wherein the transmission device has a data fax, SMS or USSD transmission unit.

9. The telecommunications terminal as claimed in claim 1, wherein the selection device has menu guidance.

10. The telecommunications terminal as claimed in claim 1, wherein the memory device is a multi-area memory to store a plurality of strings of digits in the memory areas, which can each be accessed using the actuation device.

11. The telecommunications terminal as claimed in claim 1, wherein the transmission device has an associated encryption unit to encrypt the user-specific data before and/or during transmission.

12. The telecommunications terminal as claimed in claim 1, wherein the terminal is a mobile telephone.

13. The telecommunications terminal as claimed in claim 1, wherein the transmission device is configured to transmit the user-specific data via an IP network and has a web browser.

14. The telecommunications terminal as claimed in claim 1, wherein the input device and/or the memory device are held in a supplementary module, which is connected via an interface with data capability, for a telephone, having a separate housing.

15. The telecommunications terminal as claimed in claim 14, wherein the supplementary module has a digit or alphanumeric keypad or a touch screen.

* * * * *